July 2, 1963   J. M. FORSYTH   3,096,077
BARRING JACK
Filed Dec. 9, 1958   2 Sheets-Sheet 1
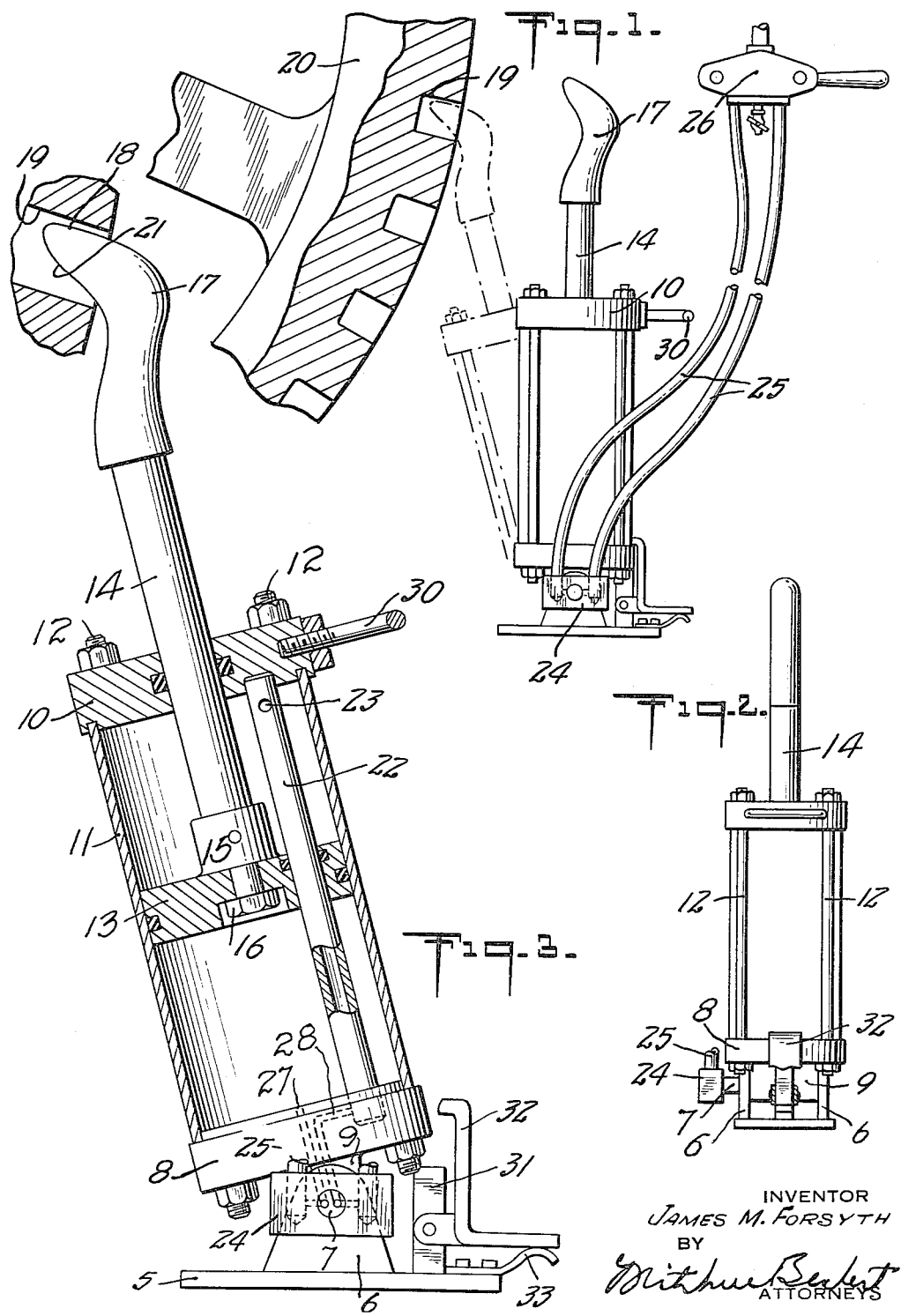
INVENTOR
JAMES M. FORSYTH
BY
ATTORNEYS

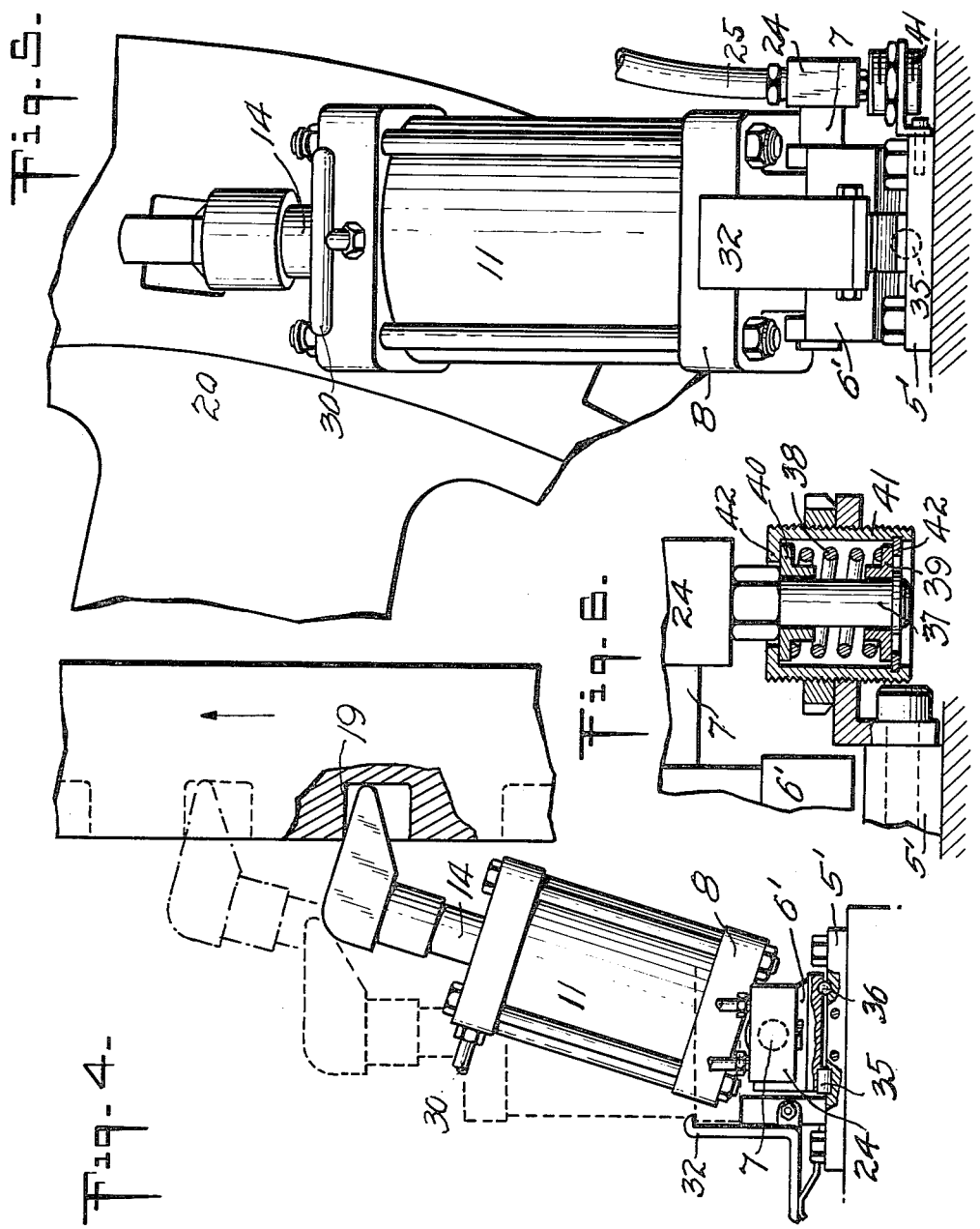

United States Patent Office 3,096,077
Patented July 2, 1963

3,096,077
BARRING JACK
James M. Forsyth, % Forsyth Engineering Co., P.O. Box 1623, 875 Lockwood Drive, Houston, Tex.
Filed Dec. 9, 1958, Ser. No. 779,106
5 Claims. (Cl. 254—93)

The invention relates to a barring jack and more specifically to a fluid pressure actuated means for step by step turning of the flywheel of a large engine.

The flywheels of large engines are usually notched about the circumference for receiving a long bar for turning the flywheel over step by step.

It is an object of the invention to provide improved power means for turning the flywheel of a large engine step by step.

A further object is to provide an improved power means for step-by-step rotation of the flywheel of an engine, so arranged as to be gravity held in position to engage and rotate the flywheel together with means for holding the power means in an out-of-the-way position.

It is a further object to provide an improved power means for step-by-step rotation of the flywheel of an engine and so arranged as to avoid the necessity for exposed piping other than the piping necessary for conducting pressure fluid to the power means and which piping may be of a permanent nature.

Other objects and various features of novelty and invention will be hereinafter pointed out, or will become apparent to those skilled in the art.

Briefly stated, in a preferred form of the invention there is a base or frame which may be fixed to the floor or foundation adjacent the periphery of the flywheel of an engine. A fluid pressure actuated means, preferably in the form of a piston and cylinder, is supported on said frame by axle means extending transversely of the cylinder so as to permit the cylinder to oscillate or rock on its axle means during the operation of the jack. Within the cylinder is a piston carrying a piston rod extending through one head of the cylinder. At the free end the piston rod carries a barring head to fit in the notches in the periphery of an engine flywheel and so arranged as to cam itself out of a notch upon the rotation of the flywheel in the proper direction or a withdrawal or reversal of the direction of motion of the piston rod.

Fluid pressure connections are made to the axle means, which supports the cylinder from the base or frame, and from this axle means fluid pressure passages lead to both ends of the cylinder. These passages to both ends of the cylinder are internal of the cylinder so as to avoid external piping. Pressure fluid is introduced to the passages in the axle means through suitable means such as a four-way valve common in the art and so arranged as to pass fluid pressure into the cylinder so as to reciprocate the piston therein. The base is so positioned relatively to the flywheel that the cylinder and all the parts carried thereby are tilted over and gravity held so that the barring head on the piston rod engages the peripheral surface of the flywheel or the notches therein. Means are preferably provided for holding the cylinder and the barring head on the piston in and out of the way position when not in use so as to avoid injury to any parts or accidents in connection with the barring jack.

In the drawings which show, for illustrative purposes only, a preferred form of the invention:

FIG. 1 is a fragmentary view of a flywheel of an engine and shows the improved jack in idle position, and in dot-dash lines, in operative position;

FIG. 2 is a view in righthand elevation of the barring jack shown in FIG. 1, the flywheel not being shown;

FIG. 3 is an enlarged view similar to FIG. 1 illustrating parts in section.

FIG. 4 is a view similar to FIG. 2, but illustrating a modification.

FIG. 5 is an enlarged view of the device shown in FIG. 4 but viewed at right angles thereto.

FIG. 6 is an enlarged fragmentary view in partial section of the bottom part of FIG. 5.

In the form illustrated (FIGS. 1-3) there is a frame or base 5 which may be bolted to or at least rest on the floor of the foundation adjacent to the periphery of the flywheel. This frame carries the operative parts of the barring jack. As shown there is a pair of spaced upright brackets 6—6, and an axle means 7 is either rotatively or non-rotatively carried by these brackets 6. The cylinder has one cylinder head 8, which on the bottom has an extension 9 through which the axle means 7 passes. This axle 7 may be secured to the frame and the part 9 may rotate thereon or the axle 7 may be secured to the part 9 and rotate in the frame brackets 6.

The cylinder has a top head 10 and the tubular cylinder 11 is held between the two heads, which may be clamped together by means of through rods 12, as will be clear. The cylinder carries a piston 13, to which the piston rod 14 is rigidly secured as by means of the collar or shoulder member 15 and the nut 16. At the upper end of the piston rod 14 there is a barring head 17 which has a front surface 18 to engage within a notch such as 19 to rotate the flywheel 20 step by step, as will be understood. The barring head 17 also has a lower surface 21 inclined at such a cam angle that when the piston rod 14 is retracted this camming surface 21 will cam the entire head out of the notch and permit the nose of the head to ride on the outside of the flywheel and move down to engage in the next or some succeeding notch below. Thus, as the piston reciprocates the barring head will rotate the flywheel step by step and, depending upon the spacing of the notches and the length of the stroke of the barring head, the flywheel will be fed one or more notches at a time.

Within the cylinder is a tubular member 22 secured in or between the two heads 8—10 of the cylinder. This tube has an opening 23 at the top of the cylinder. A fluid block 24 on the axle 7 has fluid pressure connections 25 connected thereto, and these connections 25 are preferably in the form of permanent pipes which may be connected through the four-way valve 26 to a source of pressure fluid and to exhaust. Fluid passages extend from the conenctions 25 axially through part of the shaft or axle 7 and transversely through the axle and the depending part 9 on the lower cylinder head, and the cylinder head into the lower end of the cylinder as indicated at 27 and into the tubular member 22 as indicated at 28. Thus pressure fluid from the four-way valve 26 may be introduced into one end of the cylinder and exhausted from the other end, as will be understood.

In the form shown, the only exposed pipes or tubes may be the outside connections 25 and the connection from the fluid pressure source to the valve and from the valve to exhaust or to the sump (in case of hydraulic pressure fluid).

Thus, with the parts substantially as shown in FIG. 3, the fluid pressure is being admitted beneath the piston 13, the head 17 will be moving up and to engage in the notch 19 so as to advance the flywheel. With the pressure conditions in the cylinder reversed, the barring head 17 would be cammed out and would drop down over the periphery of the flywheel to the next lower or some succeeding notch, so that when the piston again rises the flywheel again will be moved around one step.

It will be seen that all of the parts are held, preferably by gravity, in the operative position, as shown in FIG. 3, and in the dot-dash position shown in FIG. 1. When the flywheel has been moved to its desired position, the jack may be moved to an out-of-the-way position. The handle 30 may be grasped and the jack swung about the axis of the axle 7 into more or less vertical position, as shown in full lines in FIG. 1. In that position the bottom of the lower cylinder head 8 will rest on the abutment 31, and the L-shaped latch 32 will have its upper end latched over the slight projection of the top of the lower cylinder head 8, as shown in FIG. 1, so as to hold the entire barring jack in that out-of-the-way position. A spring 33 urges the latch into position so as to engage and hold the cylinder. When it is desired to again put the jack into operative position, the latch 32 may be pressed by the foot and the cylinder parts connected thereto simply pushed over to the inclined position until the barring head engages the flywheel.

In the form shown in FIGS. 4, 5 and 6 the parts, in general, are the same as those shown in the other figures and the same reference characters have been applied where the parts are the same. The form shown in FIGS. 4–6 is designed to be applied at the side rather than at the circumferential periphery of the flywheel. It will be seen that when the barring jack is applied at the circumferential periphery there is only to-and-fro motion for the jack about the axle 7, however when the jack is applied to the side of the flywheel, there is not only to-and-fro motion of the jack when the head clicks in and out of the notches of the flywheel but there is also sidewise motion to the jack due to the angularity of the flywheel in moving so as to present the notches successively to the jack. Therefore in order to prevent any possible damage to the jack or to the flywheel, the jack is provided with means to permit the universal motion to take care of the compound motions of the jack during the barring operations.

In the form shown in FIGS. 4–6 the block 24 carried by the axle 7 is applied at the opposite end of the axle from that shown in FIGS. 1–3. In the modified form in FIGS. 4–6 the jack is rockable about the axle 7, the same as in the other case. However to take care of the sidewise motion, the bracket 6' corresponding to the bracket 6 is mounted for rocking motion about an axis at right angles to the axis of the axle 7. As illustrated, between the brackets 6' and the base 5' secured to the foundation, I provide means for permitting the additional rocking motion noted. In the form shown there is provided a roller 35 between the bracket 6' and the base 5'. In addition I preferably provide a second bearing in the form of a ball 36 likewise interposed between the bracket 6' and the base 5'. Thus the entire jack may rock about the roller 35 and the ball 36 and the latter will tend to hold the parts in position for proper rocking action.

In order to keep the jack normally in a centralized position I provide spring means for holding the jack normally and which will permit the extra rocking motion about the axis through the roller 35 and ball 36. As illustrated, there is a rod 37 carried by the fluid connection block 24 which rod carries a coil spring 38 abutting a washer or the like 39 loose on the end of the rod 37. The spring at the opposite end abuts a corresponding loose washer 40 limited in its upward movement on the rod 37. An abutment means preferably in the form of a cylinder or cage 41 is carried by the base 5' and the cylinder has bottom and top abutments 42 for engagement by the washers 39 and 40. Therefore, as the bracket 6' swings about the axis of the roller 35 and ball 36 in a clockwise direction the spring 38 will be compressed between the lower abutment 42 and the upper washer 40 carried on the rod 37. As soon as the swinging pressure is released the spring 38 will move the fluid connection block 24 up to the normal position shown in FIG. 6. By the same token when the bracket 6' is rocked in a counterclockwise direction, the spring 38 will be compressed between the washer 39 on the rod 37 and the upper washer 40 is engaged with the upper abutment 42. When the rocking pressure is relieved the spring will again return the bracket 6' to its normal position shown in FIG. 6. It will be seen then that the jack will always be held by the spring 38 in normal position so that the head on the jack may engage in a flywheel notch and be carried upwardly and to the right as viewed in FIG. 5 without damage to any of the parts. The jack is at all times free to swing about the axis of the axle 7. Thus the jack may swing on the two axes at the right angles to each other without danger of damage to any of the parts.

It will be seen then that I have provided an improved barring jack which will turn the flywheel of an engine without the back breaking labor of barring the same over by hand. The control valve 26 is simply actuated to reciprocate the piston and the barring head 17 so as to turn the engine over as described. The barring head is always maintained in its proper angular position by means of the tubular member 22 which extends through the piston, and prevents the latter and the piston rod from rotating. All of the connections except the primary connections to the block 24 are concealed so as to avoid the usually unsatisfactory external flexible piping and thus avoid injury thereto. All the parts are simple to construct and the entire device may be readily taken apart for repair.

The barring jack is entirely safe to use in that it is latched in inoperative position, and even if it should accidentally become unlatched no great harm would result because if the flywheel were turning it would simply act on the head 17 so as to keep the cylinder in position no closer to the flywheel than the position shown in FIG. 3.

While the invention has been described in considerable detail, it is to be understood that many changes and modifications may be made within the scope of the invention as defined in the appending claims.

I claim:

1. In a barring jack, a base, a cylinder, axle means carried by said base and supporting said cylinder for oscillation about the axis of said axle means, pressure fluid connection means to said axle means and from said axle means to the adjacent end of said cylinder, a hollow tube extending from said fluid pressure connection means within said cylinder to the opposite end of said cylinder, a piston in said cylinder and guided on said tube and prevented thereby from rotation in said cylinder, means to fixedly support said hollow tube at the opposite end from said fluid pressure connection means whereby said hollow tube passes through said piston, and a piston rod on said piston and having a barring head at the end thereof for engagement in notches in the flywheel of an engine, said axle means allowing oscillation about the axis thereof from a non-operating position to an operating position, and means for restraining said cylinder in said non-operating position.

2. In a barring jack, a cylinder having heads at opposite ends thereof, a piston in said cylinder, a piston rod extending from said piston through one cylinder head to the outside of the cylinder, a barring head on said piston rod for engagement with notches in an engine flywheel, a tube extending longitudinally in said cylinder and through said piston and secured to at least one head of said cylinder, said tube having an opening into the end of said cylinder adjacent said one cylinder head, a base, axle means carried by said base and supporting said cylinder on said base at a location spaced from said engine flywheel so that said barring head is maintained in contact with said engine flywheel when said cylinder is tilted to a first position and is maintained out of contact with said engine flywheel when said cylinder is tilted to a second position, said axle means extending in a direction transverse of said cylinder whereby the latter may oscillate in a predetermined plane about said axle means so that said barring head engages with successive notches, at least two pressure fluid connections to said axle means, one of said connections opening into the end of said cylinder adjacent said axle and the other of said passage means opening into said tube and through said tube into the other end of said cylinder, whereby pressure fluid may be introduced into either end of said cylinder for reciprocating said piston for causing said barring head to rotate the flywheel of an engine step by step, and latching means for latching said cylinder in said second position to hold said barring head out of any engagement with the flywheel.

3. In a barring jack for barring over a flywheel of an engine,
a base,
a jack cylinder,
first and second pivot means carried by said base and supporting said cylinder for oscillation about the axes of said pivot means,
the axis of said first pivot means being substantially at right angles to the axis of said cylinder,
and the axis of said second pivot means being substantially at right angles to said axis of said first pivot means and said cylinder axis, to thereby allow said jack to be applied to the side of the flywheel,
pressure fluid connection means coupled through one of said pivot means and to an adjacent end of said cylinder,
a hollow tube extending from said fluid pressure connection means within said cylinder to the opposite end of said cylinder,
a piston in said cylinder and guided on said tube and prevented thereby from rotation in said cylinder,
means to fixedly support said hollow tube at the opposite end from said fluid pressure connection means, whereby said hollow tube passes through said piston,
and a piston rod on said piston and having a barring head at the end thereof for engagement in notches in said flywheel,
said first and second pivot means allowing oscillation about the axes thereof from a non-operating position to an operating position,
and means for restraining said cylinder in said non-operating position.

4. In a barring jack for barring over a flywheel of an engine,
a base,
a jack cylinder,
first and second pivot means carried by said base and supporting said cylinder for oscillation about the axes of said pivot means,
the axis of said first pivot means being substantially at right angles to the axis of said cylinder,
and the axis of said second pivot means being substantially at right angles to said axis of said first pivot means and said cylinder axis, to thereby allow said jack to be applied to the side of the flywheel,
pressure fluid connection means coupled through one of said pivot means and to an adjacent end of said cylinder,
a piston in said cylinder and controlled by said pressure fluid connection means,
and a piston rod on said piston and having a barring head at the end thereof for engagement in notches in said flywheel,
means to prevent rotation of said barring head about the axis of said cylinder,
said first and second pivot means allowing oscillation about the axes thereof from a non-operating position to an operating position,
and means for restraining said cylinder in said non-operating position.

5. In the combination defined in claim 4 and spring means for constantly urging said cylinder and piston device to a definite generally upright position.

References Cited in the file of this patent
UNITED STATES PATENTS

| | | |
|---|---|---|
| 935,235 | Sargent | Sept. 28, 1909 |
| 1,102,792 | Patton | July 7, 1914 |
| 1,191,011 | Lewis | July 11, 1916 |
| 1,475,552 | Peterson | Nov. 27, 1923 |
| 2,165,366 | Gormley | July 11, 1939 |
| 2,269,835 | Wallace et al. | Jan. 13, 1942 |
| 2,790,426 | Mueller | Apr. 30, 1957 |